(12) United States Patent
Miller et al.

(10) Patent No.: US 10,328,814 B2
(45) Date of Patent: Jun. 25, 2019

(54) SYSTEMS AND METHODS TO DETERMINE ELECTRIC VEHICLE RANGE BASED ON ENVIRONMENTAL FACTORS

(71) Applicant: Ford Global Technologies, LLC, Dearborn, MI (US)

(72) Inventors: Kenneth James Miller, Canton, MI (US); William Paul Perkins, Dearborn, MI (US); Jimmy Kapadia, Ottawa Hills, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 15/091,311

(22) Filed: Apr. 5, 2016

(65) Prior Publication Data

US 2017/0282738 A1 Oct. 5, 2017

(51) Int. Cl.
*B60L 1/00* (2006.01)
*B60W 20/00* (2016.01)
(Continued)

(52) U.S. Cl.
CPC .............. *B60L 11/1861* (2013.01); *B60L 1/02* (2013.01); *B60L 2240/12* (2013.01); *B60L 2240/34* (2013.01); *B60L 2240/547* (2013.01); *B60L 2240/62* (2013.01); *B60L 2240/64* (2013.01); *B60L 2240/662* (2013.01); *B60L 2260/52* (2013.01); *B60L 2260/54* (2013.01); *Y02T 10/7005* (2013.01); *Y02T 10/705* (2013.01);
(Continued)

(58) Field of Classification Search
CPC .... B60L 11/1861; B60L 1/02; B60L 2240/12; B60L 2240/34; B60L 2240/547; B60L 2240/64; B60L 2260/52; B60L 11/1862
USPC .......................................................... 701/22
See application file for complete search history.

(56) References Cited

U.S. PATENT DOCUMENTS

| 8,874,367 | B2 | 10/2014 | Vicharelli et al. | |
|---|---|---|---|---|
| 2007/0246209 | A1* | 10/2007 | Lee ........................ | B60H 1/004 165/202 |

(Continued)

FOREIGN PATENT DOCUMENTS

| CN | 103168211 A | 6/2013 |
|---|---|---|
| DE | 102011113715 A1 | 3/2012 |

(Continued)

OTHER PUBLICATIONS

Shams-Zahraei M. Integrated Thermal and Energy Management of PHEV (Year: 2012).*

(Continued)

*Primary Examiner* — Charles J Han
(74) *Attorney, Agent, or Firm* — Frank Lollo; Neal, Gerber & Eisenberg LLP; James P. Muraff (57) ABSTRACT

Example systems and methods to determine electric vehicle range based on environmental factors are disclosed. An example disclosed vehicle includes a battery pack, a HVAC control module, and an electronic control unit that includes a range calculator. The example range calculator determine a base power load, determines an auxiliary power load based on a sun load, an ambient temperature, a cabin temperature, and a temperature setting, and calculates a range of the vehicle based on the base power load, the auxiliary power load and a charge of the battery pack.

12 Claims, 8 Drawing Sheets

(51) Int. Cl.
*B60W 10/30* (2006.01)
*B60L 11/18* (2006.01)
*B60L 1/02* (2006.01)

(52) U.S. Cl.
CPC ........ *Y02T 10/7044* (2013.01); *Y02T 10/7291* (2013.01); *Y02T 90/16* (2013.01); *Y02T 90/162* (2013.01)

(56) References Cited

U.S. PATENT DOCUMENTS

| | | | |
|---|---|---|---|
| 2009/0301116 A1* | 12/2009 | Nathan | B60H 1/00428 62/208 |
| 2011/0184600 A1 | 7/2011 | Kristinsson et al. | |
| 2012/0109413 A1* | 5/2012 | Smith | B60L 11/1877 701/1 |
| 2013/0073113 A1 | 3/2013 | Wang et al. | |
| 2013/0096818 A1* | 4/2013 | Vicharelli | G01C 21/3469 701/423 |
| 2013/0110330 A1* | 5/2013 | Atluri | B60L 1/003 701/22 |
| 2014/0025214 A1* | 1/2014 | Ito | G05F 5/00 700/291 |
| 2015/0027152 A1* | 1/2015 | Marco | B60H 1/00885 62/126 |
| 2015/0032318 A1 | 1/2015 | Gao | |
| 2016/0375785 A1 | 12/2016 | Liu | |
| 2016/0375787 A1* | 12/2016 | Liu | B60L 11/1861 701/22 |

FOREIGN PATENT DOCUMENTS

| | | |
|---|---|---|
| DE | 102011116115 A1 | 4/2013 |
| DE | 102012218787 A1 | 4/2014 |
| DE | 102014204308 A1 | 9/2015 |
| GB | 2505663 A | 3/2014 |

OTHER PUBLICATIONS

Kiran R. Kambly et al. *Estimating the HVAC energy consumption of plug-in electric vehicles*, 2014 (8 Pages) Colorado State University, Department of Mechanical Engineering, Fort Collins, CO, USA.
Search Report dated Sep. 12, 2017 for GB Patent Application No. GB 1704419.9 (4 pages).

* cited by examiner

| Sun Load (W/m²) | Cabin Temp minus Ambient Air Temp (deg-F) | | | | | | | | | | |
|---|---|---|---|---|---|---|---|---|---|---|---|
| | -20 | -10 | 0 | 10 | 20 | 30 | 40 | 50 | 60 | 70 | 80 |
| 0 | 0 | 0 | 0 | 0 | 0 | 0 | 0 | 0 | 0 | 0 | 0 |
| 50 | 54 | 42 | 30 | 18 | 6 | -6 | -18 | -30 | -42 | -54 | -66 |
| 100 | 108 | 84 | 60 | 36 | 12 | -12 | -36 | -60 | -84 | -108 | -132 |
| 150 | 162 | 126 | 90 | 54 | 18 | -18 | -54 | -90 | -126 | -162 | -198 |
| 200 | 216 | 168 | 120 | 72 | 24 | -24 | -72 | -120 | -168 | -216 | -264 |
| 250 | 270 | 210 | 150 | 90 | 30 | -30 | -90 | -150 | -210 | -270 | -330 |
| 300 | 324 | 252 | 180 | 108 | 36 | -36 | -108 | -180 | -252 | -324 | -396 |
| 350 | 378 | 294 | 210 | 126 | 42 | -42 | -126 | -210 | -294 | -378 | -462 |
| 400 | 432 | 336 | 240 | 144 | 48 | -48 | -144 | -240 | -336 | -432 | -528 |
| 450 | 486 | 378 | 270 | 162 | 54 | -54 | -162 | -270 | -378 | -486 | -594 |
| 500 | 540 | 420 | 300 | 180 | 60 | -60 | -180 | -300 | -420 | -540 | -660 |
| 550 | 594 | 462 | 330 | 198 | 66 | -66 | -198 | -330 | -462 | -594 | -726 |
| 600 | 648 | 504 | 360 | 216 | 72 | -72 | -216 | -360 | -504 | -648 | -792 |
| 650 | 702 | 546 | 390 | 234 | 78 | -78 | -234 | -390 | -546 | -702 | -858 |
| 700 | 756 | 588 | 420 | 252 | 84 | -84 | -252 | -420 | -588 | -756 | -924 |
| 750 | 810 | 630 | 450 | 270 | 90 | -90 | -270 | -450 | -630 | -810 | -990 |
| 800 | 864 | 672 | 480 | 288 | 96 | -96 | -288 | -480 | -672 | -864 | -1056 |
| 850 | 918 | 714 | 510 | 306 | 102 | -102 | -306 | -510 | -714 | -918 | -1122 |
| 900 | 972 | 756 | 540 | 324 | 108 | -108 | -324 | -540 | -756 | -972 | -1188 |
| 950 | 1026 | 798 | 570 | 342 | 114 | -114 | -342 | -570 | -798 | -1026 | -1254 |
| 1000 | 1080 | 840 | 600 | 360 | 120 | -120 | -360 | -600 | -840 | -1080 | -1320 |

FIG. 5

| Vehicle Speed (mi/hr) | Cabin Temp minus Ambient Air Temp (deg-F) | | | | | | | | | | |
|---|---|---|---|---|---|---|---|---|---|---|---|
| | -20 | -10 | 0 | 10 | 20 | 30 | 40 | 50 | 60 | 70 | 80 |
| 0 | | | | | | | | | | | |
| 5 | 134 | 67 | 0 | -67 | -134 | -201 | -268 | -335 | -402 | -469 | -536 |
| 10 | 212 | 106 | 0 | -106 | -212 | -318 | -424 | -530 | -636 | -742 | -848 |
| 15 | 290 | 145 | 0 | -145 | -290 | -435 | -580 | -725 | -870 | -1015 | -1160 |
| 20 | 368 | 184 | 0 | -184 | -368 | -552 | -736 | -920 | -1104 | -1288 | -1472 |
| 25 | 446 | 223 | 0 | -223 | -446 | -669 | -892 | -1115 | -1338 | -1561 | -1784 |
| 30 | 524 | 262 | 0 | -262 | -524 | -786 | -1048 | -1310 | -1572 | -1834 | -2096 |
| 35 | 602 | 301 | 0 | -301 | -602 | -903 | -1204 | -1505 | -1806 | -2107 | -2408 |
| 40 | 680 | 340 | 0 | -340 | -680 | -1020 | -1360 | -1700 | -2040 | -2380 | -2720 |
| 45 | 758 | 379 | 0 | -379 | -758 | -1137 | -1516 | -1895 | -2274 | -2653 | -3032 |
| 50 | 836 | 418 | 0 | -418 | -836 | -1254 | -1672 | -2090 | -2508 | -2926 | -3344 |
| 55 | 914 | 457 | 0 | -457 | -914 | -1371 | -1828 | -2285 | -2742 | -3199 | -3656 |
| 60 | 992 | 496 | 0 | -496 | -992 | -1488 | -1984 | -2480 | -2976 | -3472 | -3968 |
| 65 | 1070 | 535 | 0 | -535 | -1070 | -1605 | -2140 | -2675 | -3210 | -3745 | -4280 |
| 70 | 1148 | 574 | 0 | -574 | -1148 | -1722 | -2296 | -2870 | -3444 | -4018 | -4592 |
| 75 | 1226 | 613 | 0 | -613 | -1226 | -1839 | -2452 | -3065 | -3678 | -4291 | -4904 |
| 80 | 1304 | 652 | 0 | -652 | -1304 | -1956 | -2608 | -3260 | -3912 | -4564 | -5216 |
| 85 | 1382 | 691 | 0 | -691 | -1382 | -2073 | -2764 | -3455 | -4146 | -4837 | -5528 |
| 90 | 1460 | 730 | 0 | -730 | -1460 | -2190 | -2920 | -3650 | -4380 | -5110 | -5840 |
| 95 | 1538 | 769 | 0 | -769 | -1538 | -2307 | -3076 | -3845 | -4614 | -5383 | -6152 |
| 100 | 1616 | 808 | 0 | -808 | -1616 | -2424 | -3232 | -4040 | -4848 | -5656 | -6464 |
| | 1694 | 847 | 0 | -847 | -1694 | -2541 | -3388 | -4235 | -5082 | -5929 | -6776 |

FIG. 6

| Cabin Temp (deg-F) | Temp Request (deg-F) | Progression of Time (min) | | | | | |
|---|---|---|---|---|---|---|---|
| | | 0 | 0.5 | 1 | 1.5 | 30 | 30.5 |
| -20 | 60 | 5000 | 5000 | 5000 | 5000 | 4520 | 4520 |
| | 65 | 5000 | 5000 | 5000 | 5000 | 4680 | 4680 |
| | 70 | 5000 | 5000 | 5000 | 5000 | 4840 | 4840 |
| | 75 | 5000 | 5000 | 5000 | 5000 | 5000 | 5000 |
| | 80 | 5000 | 5000 | 5000 | 5000 | 5000 | 5000 |
| | 85 | 5000 | 5000 | 5000 | 5000 | 5000 | 5000 |
| | 90 | 5000 | 5000 | 5000 | 5000 | 5000 | 5000 |
| 70 | 60 | -3650 | -3650 | -3650 | -3650 | -800 | -800 |
| | 65 | -1825 | -1825 | -1825 | -1825 | -400 | -400 |
| | 70 | 0 | 0 | 0 | 0 | 0 | 0 |
| | 75 | 1825 | 1825 | 1825 | 1825 | 400 | 400 |
| | 80 | 3650 | 3650 | 3650 | 3650 | 800 | 800 |
| | 85 | 5000 | 5000 | 5000 | 5000 | 1200 | 1200 |
| | 90 | 5000 | 5000 | 5000 | 5000 | 1600 | 1600 |
| 120 | 60 | -3650 | -3650 | -3650 | -3650 | -3650 | -3650 |
| | 65 | -3650 | -3650 | -3650 | -3650 | -3400 | -3400 |
| | 70 | -3650 | -3650 | -3650 | -3650 | -3150 | -3150 |
| | 75 | -3650 | -3650 | -3650 | -3650 | -2900 | -2900 |
| | 80 | -3650 | -3650 | -3650 | -3650 | -2650 | -2650 |
| | 85 | -3650 | -3650 | -3650 | -3650 | -2400 | -2400 |
| | 90 | -3650 | -3650 | -3650 | -3650 | -2150 | -2150 |

SYSTEMS AND METHODS TO DETERMINE ELECTRIC VEHICLE RANGE BASED ON ENVIRONMENTAL FACTORS

TECHNICAL FIELD

The present disclosure generally relates to electric vehicles and, more specifically, systems and methods to determine electric vehicle range based on environmental factors.

BACKGROUND

Drivers of electric vehicles, especially drivers that recently purchased the electric vehicle, can experience a phenomenon known as "range anxiety." Range anxiety is the fear of running out of battery charge before reaching the driver's destination. The range of an electric vehicle is based on the charge of the battery and the amount of power consumed while driving the vehicle. However, power consumption while driving can vary. Electric vehicles determine a range estimate to inform drivers whether the electric vehicle has enough charge to get a destination. Inaccurate estimates may cause driver frustration and anxiety.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments of systems and methods to determine electric vehicle range based on environmental factors are disclosed. An example disclosed vehicle includes a battery pack, a HVAC control module, and an electronic control unit that includes a range calculator. The example range calculator determine a base power load, determines an auxiliary power load based on a sun load, an ambient temperature, a cabin temperature, and a temperature setting, and calculates a range of the vehicle based on the base power load, the auxiliary power load and a charge of the battery pack.

An example method to determine an estimated range of an electric vehicle includes determining a base power load on a battery pack used to drive an electric motor of the electric vehicle. The example method also includes determining an auxiliary power load on the battery pack used to power an HVAC control module of the electric vehicle. The auxiliary power load is based on a sun load, an ambient temperature, a cabin temperature, and a temperature setting. Additionally, the example method calculating, with the estimated range of the vehicle based on the base power load, the auxiliary power load and a charge of the battery pack.

An example tangible computer readable medium comprises instructions that, when executed, cause a vehicle to determine a base power load on a battery pack used to drive an electric motor of the electric vehicle. The example instruction also cause the vehicle to determine an auxiliary power load on the battery pack used to power an HVAC control module of the electric vehicle, the auxiliary power load based on a sun load, an ambient temperature, a cabin temperature, and a temperature setting. Additionally, the example instructions cause the vehicle to calculate the estimated range of the vehicle based on the base power load, the auxiliary power load and a charge of the battery pack.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 6 depicts another example table stored by the electric vehicle of FIG. 1 to determine variable power consumption based on environmental effects.

DETAILED DESCRIPTION OF EXAMPLE EMBODIMENTS

While the invention may be embodied in various forms, as shown in the drawings, and will hereinafter be described, some exemplary and non-limiting embodiments, with the understanding that the present disclosure is to be considered an exemplification of the invention and is not intended to limit the invention to the specific embodiments illustrated.

The range of an electric vehicle is determined by the available power from the battery and the power consumed while operating the vehicle. The available power is based on the capacity and charge of the battery. The power consumption is based on a base power load (e.g., the power to propel the vehicle) and an auxiliary power load (e.g., the power to operate other systems of the vehicle, such as a heating, ventilating, and cooling (HVAC) system, a radio, a center console display, etc.). Drivers do not want to sacrifice comforts of a traditional fuel-based vehicle when driving an electric vehicle. One of the basic comforts of a vehicle is climate control. The auxiliary power load is dominated by the power required to operate the HVAC system. The auxiliary power load is defined by two operational periods, a pulldown period and a stabilized period. The pulldown period is a period of time of heightened power consumption in which the HVAC system adjusts the temperature of the cabin to a driver-selected temperature. The heightened power consumption is mainly due to the thermal energy required to change the temperature of the interior mass. The stabilized period is a period of time of relatively lower power consumption in which the HVAC system maintains the driver-selected temperature.

As disclosed herein below, a range calculator of the electric vehicle estimates the range (sometimes referred to as "electric distance to empty (eDTE)") of the electric vehicle based on (a) an estimated base power load and (b) an estimated auxiliary power load. The base power load may be estimated based on, for example, the characteristics of the roads (e.g., frequency of stops, road grade, etc.) near the electric vehicle, and/or an average of past base power loads, etc. The auxiliary power load is estimated for (i) the pulldown period and the (ii) stabilized period. The auxiliary power load is estimated based on factors that affect the use of the HVAC system, such as the convective heat transfer based on an average vehicle speed, radiative heat transfer (sometimes referred to as "solar load"), external ambient air temperature, internal ambient air temperature, and/or climate settings. The range calculator determines the range of the electric vehicle by calculating the total power consumption (base power load and auxiliary power load) for the pulldown period and the total power consumption (base power load and auxiliary power load) during the stabilized period.

Figure 1:
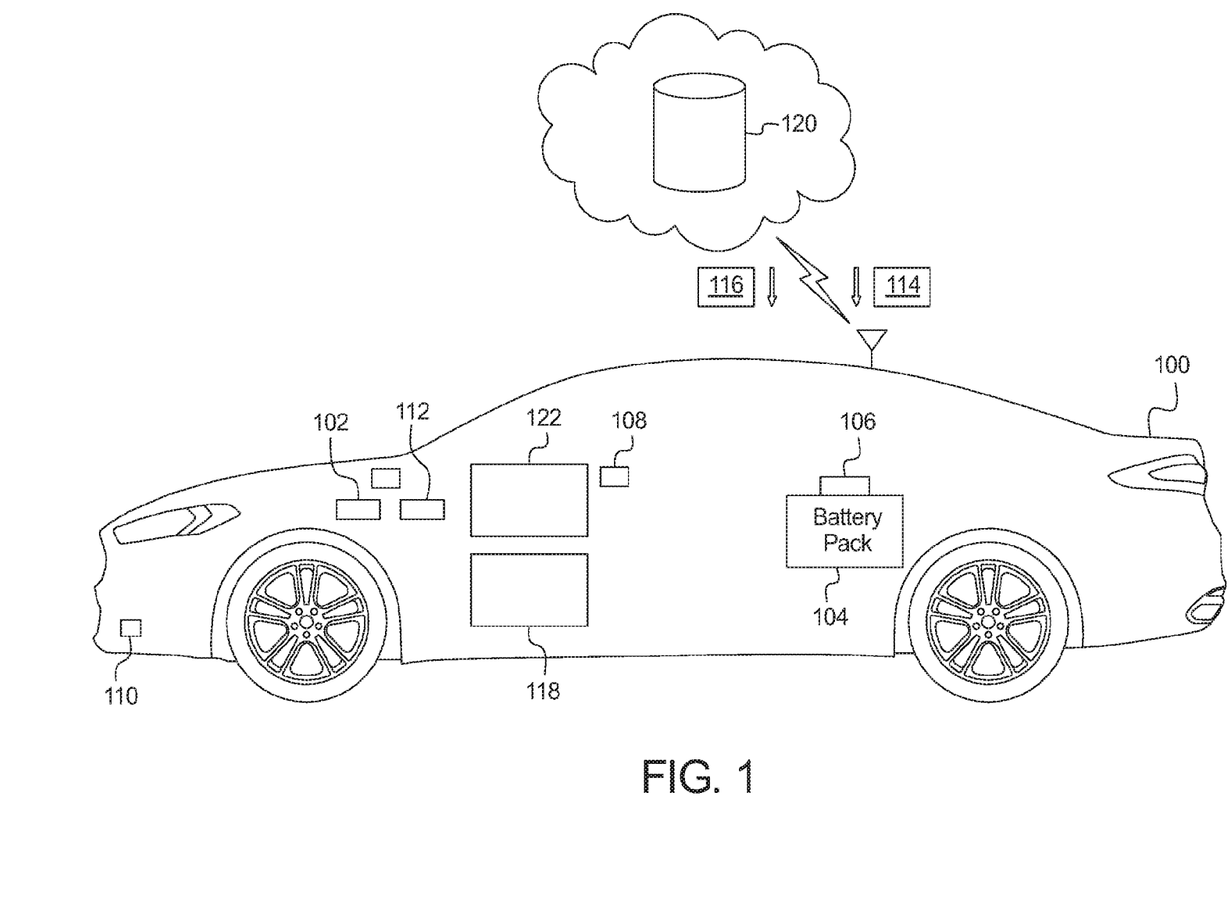
FIG. 1 illustrates an electric vehicle that determines an electric vehicle range based on environmental factors in accordance with the teachings of this disclosure.

FIG. 1 illustrates an electric vehicle 100 that determines an electric vehicle (EV) range based on environmental factors in accordance with the teachings of this disclosure. A range calculator 102 determines the EV range of the electric vehicle 100 based on information from a battery pack 104 via a battery management unit 106, one or more cabin temperature sensors 108, and ambient temperature sensor 110, a heating, ventilating, and cooling (HVAC) control module 112, and sun load data 114 and/or navigation data 116. The electric vehicle 100 includes an on-board communications platform 118 to connect to one or more Internet servers 120 (sometime referred to as the "cloud") to retrieve the sun load data 114 and/or the navigation data 116. The range calculator 102 provides the EV range determination via an infotainment head unit 122.

The electric vehicle 100 is any type of electric road vehicle (e.g., cars, trucks, vans, motorcycles, mopeds, etc.). The electric vehicle 100 includes parts related to mobility, such as a powertrain with an electric motor, a transmission, a suspension, a driveshaft, and/or wheels, etc. The electric vehicle 100 also may include one or more standard features (not shown) such as a dashboard, adjustable seats, a windshield, doors, windows, seatbelts, airbags, and tires. The battery pack 104 may include one or more of any suitable electric battery cells (such as lithium ion, lithium polymer, nickel-metal hydride, etc.) to supply power to the electric vehicle 100. The battery management unit 106 monitors and controls the state of the battery pack 104. The battery management unit 106 monitors and/or controls the voltage (e.g., the total voltage, the voltage of the battery cells, etc.), recharging of the battery pack 104, the current of battery back 104, and/or the temperature of the battery pack 104, etc. The battery management unit 106 may also limit the power supplied by the battery pack 104 to particular subsystems (e.g., the HVAC system, etc.) of the electric vehicle 100.

The cabin temperature sensor(s) 108 measures the temperature inside the cabin of the electric vehicle 100. The cabin temperature sensor(s) 108 may be any suitable temperature sensor (e.g., a thermistor, an infrared sensor, etc.). The ambient temperature sensor 110 measures the exterior temperature proximate the electric vehicle 100. The ambient temperature sensor 110 may be any suitable temperature sensor. In some examples, the ambient temperature sensor 110 is located in a front bumper of the electric vehicle 100.

The infotainment head unit 122 provides an interface between the electric vehicle 100 and users (e.g., drivers, passengers, etc.). The infotainment head unit 122 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers.

In some examples, the HVAC control module 112 is incorporated into the infotainment head unit 122. The HVAC control module 112 is communicatively coupled to the cabin temperature sensor(s) 108. The HVAC control module 112 controls the climate control system (e.g., an evaporator, a compressor, a condenser, a drier, an expansion device, blower fans, etc.) to heat or cool the cabin of the electric vehicle 100 based on a setting input into the HVAC control module 112 via the input devices of the infotainment head unit 122. For example, if the cabin temperature sensor(s) 108 indicates that the temperature in the cabin is 97 degrees Fahrenheit and the HVAC temperature setting is 75 degrees Fahrenheit, the HVAC control module 112 controls the HVAC system to cool the cabin of the vehicle.

The on-board communications platform 118 includes wired or wireless network interfaces to enable communication with external networks (e.g. the Internet server(s) 120). The on-board communications platform 118 also includes hardware (e.g., processors, memory, storage, antenna, etc.) and software to control the wired or wireless network interfaces. In some examples, the on-board communications platform 118 includes one or more controllers that facilitate creating and joining a local area wireless network, such as a Wi-Fi® controller (including IEEE 802.11 a/b/g/n/ac or others), a Bluetooth® controller (based on the Bluetooth® Core Specification maintained by the Bluetooth Special Interest Group), and/or a ZigBee® controller (IEEE 802.15.4). The on-board communications platform 118 may also include controllers for other standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); and Wireless Gigabit (IEEE 802.11ad), etc.). Additionally, in some examples, the on-board communications platform 118 includes a global positioning system (GPS) receiver. Further, the external network(s) may be a public network, such as the Internet; a private network, such as an intranet; or combinations thereof, and may utilize a variety of networking protocols now available or later developed including, but not limited to, TCP/IP-based networking protocols. The on-board communications platform 118 may also include a wired or wireless interface to enable direct communication with an electronic device (such as, a smart phone, a tablet computer, a laptop, etc.).

From time to time, the on-board communications platform 118 is communicatively coupled (e.g. via a cellular connection) to the Internet server(s) 120 to receive the sun load data 114 and/or the navigation data 116. The sun load data 114 provides information regarding energy (in Watts per meter squared (W/m²)) of solar radiation in the geographical region in which the electric vehicle 100 is located. For example, the sun load data 114 may indicate that the energy of the solar radiation is 300 W/m². The magnitude of the energy of the solar radiation influences the temperature of the cabin. The navigation data 116 includes road details (e.g., curves, grades, traffic, traffic controls, etc.) of roads in the vicinity of the electric vehicle 100. In some examples, when the user has specified a specific destination and/or route, the navigation data 116 includes navigation data 116 includes the road details of route(s) to the destination.

The range calculator 102 determines the EV range for the electric vehicle 100. The range calculator 102 determines the EV range when it determines that a trip is about to occur. For example, the range calculator 102 may, in response to detecting when a body control unit of the electric vehicle 100 receives a signal from a key fob to unlock a driver's side door of the electric vehicle 100, determine that a trip is about to occur. As another example, the range calculator 102 may determine that a trip is about to occur in response to a destination being entered into a navigation system. In such a manner, the range calculator 102 redetermines the EV range in response to a new trip.

Initially, the range calculator 102 selects (i) an estimated average speed for the electric vehicle 100 (ii) an estimated distance corresponding to the estimated average speed, (iii) an average road load force, and (iv) an estimated total travel time. In some examples, to select the estimated average speed and the estimated distance, the range calculator 102 selects a route from the current location of the electric vehicle 100. In some examples, the route is based on a destination entered into a navigation system. In some examples, the route is based on a pattern of past routes dependent on the day, the time, and/or the driver. For example, the range calculator 102 may recognize that a particular driver travels to the same destination at 7:00 am on Monday through Friday. Alternatively, in some examples, the estimated average speed and the estimated distance are based on past actual average speeds and past actual distances and/or destinations. In some examples, the range calculator 102 selects the average road force load based on past road load forces.

When a route is selected, the range calculator 102 divides the route into segments. In some examples, the segments are predefined in the navigation data 116 based on features of the route, such as road characteristics (e.g., curved sections, straight sections, etc.) and/or traffic signals, etc. The range calculator 102 estimates a segment speed for the segments. In some examples, the range calculator 102 estimates a segment travel time for the segments. The range calculator 102 determines the segments speeds (and the segment travel times) based on traffic data and speed limits included in the navigation data 116 and/or an average speed that the electric vehicle 100 has previously traveled through that segment. The estimated average speed for the electric vehicle 100 is the average of the segments speeds for the route. For example, if the segment speed for a first segment is 20 miles per hour (mph), the segment speed for a second segment is 17 mph, and the segment speed for a third segments is 12 mph, the estimated average speed may be 16.3 mph. In some examples, the estimated average speed for the electric vehicle 100 is the weighted average of the segments speeds for the route based on the corresponding segment travel times. For example, if the segment travel time for the first segment is 8 minutes, the segment travel time for the second segment is 11 minutes, and the segment travel time for the third segment is 6 minutes, the estimated average speed may be 16.8 mph. When a route is selected, the estimated distance is the distance to the destination.

The range calculator 102 also determines the segment road load force for the segments. The road load force represents forces on the electric vehicle 100 due to, for example, friction of tires of the electric vehicle 100, the aerodynamic drag of the electric vehicle 100 and/or a grade of the road on which the electric vehicle 100 is driving, etc. The range calculator 102 estimates the road load forces for the segments based on polynomial equation that takes into account the forces on the electric vehicle 100 as a function of the speed over the electric vehicle 100. Because ambient temperature can affect the road load forces (e.g., cold air has higher aerodynamic drag, driveline parasitic are higher when system components are colds, etc.), in some examples, the range calculator 102 adjusts the road load forces based on the ambient temperature as measured by the ambient temperature sensor 110. The range calculator 102 calculates the average road load force based on an average of the segment road load forces. For example, if the segment road load force for the first segment is 38.7 pounds (lbs), the segment road load force for the second segment is 36.2 lbs, and the segment road load force for the third segments is 32.7 lbs, the average segment road load force may be 35.8 lbs. In some examples, the range calculator 102 calculates the average road load force as a weighted average based on the segment travel times for the respective segments. For example, if the travel time for the first segment is 8 minutes, the travel time for the second segment is 11 minutes, and the segment travel time for the third segment is 6 minutes, the average road load force may be 36.1 lbs.

The range calculator 102 calculates the estimated total travel time ($t_E$) based on the estimated average speed and the estimated distance. For example, if the estimated average speed is 16.8 mph and the estimated distance is 7 miles, the estimated total travel time ($t_E$) may be 25 minutes.

Figure 2:
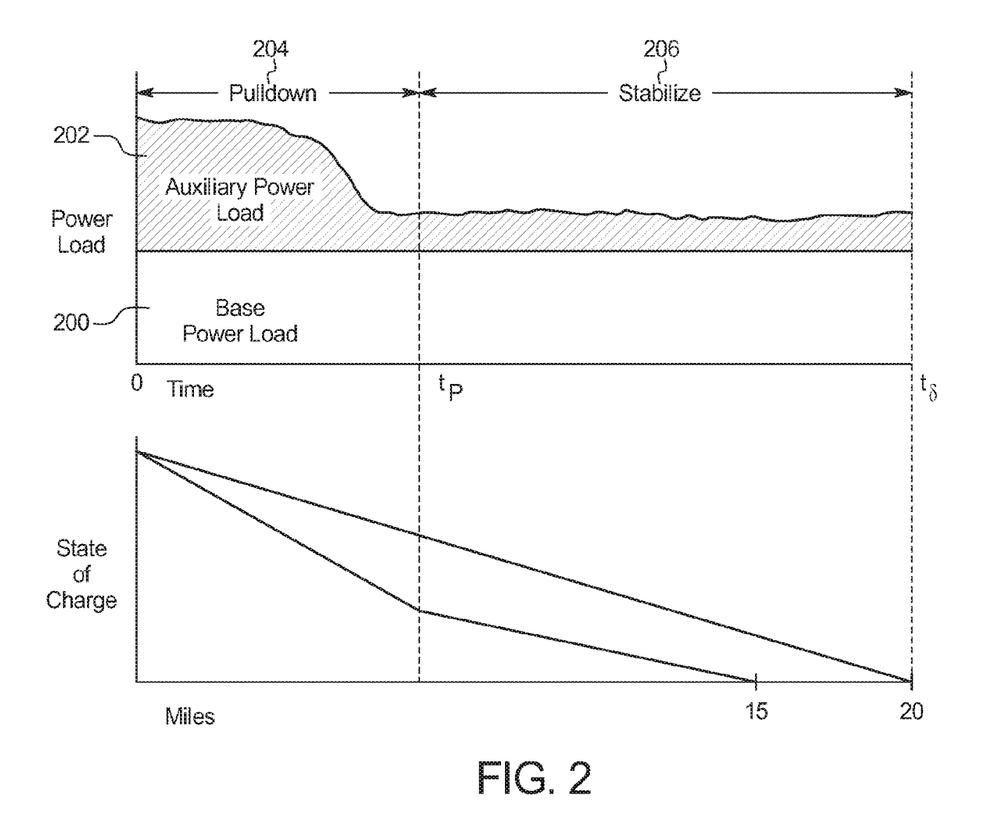
FIG. 2 depicts graphs of the energy consumption of the electric vehicle of FIG. 1 during a pulldown period and a stabilized period.

The range calculator 102 determines a base power load ($P_{BPL}$) 200 (as shown in FIG. 2) based on the estimated average speed and the average road load force. The base power load is the power used by the electric motor to propel the electric vehicle 100. For example, if the estimates average speed is 16.8 and the average road load force is 36.1 lbs, the base power load may be 1207 Watts. In some examples, the range calculator 102 adds to the base power load the average power used to accelerate the electric vehicle 100 (e.g., based on traffic signals and/or traffic data included in the navigation data 116). In some examples, the range calculator 102 subtracts from the base power load the average power gained through regenerative braking (e.g., based on traffic signals and/or traffic data included in the navigation data 116).

Figure 3:
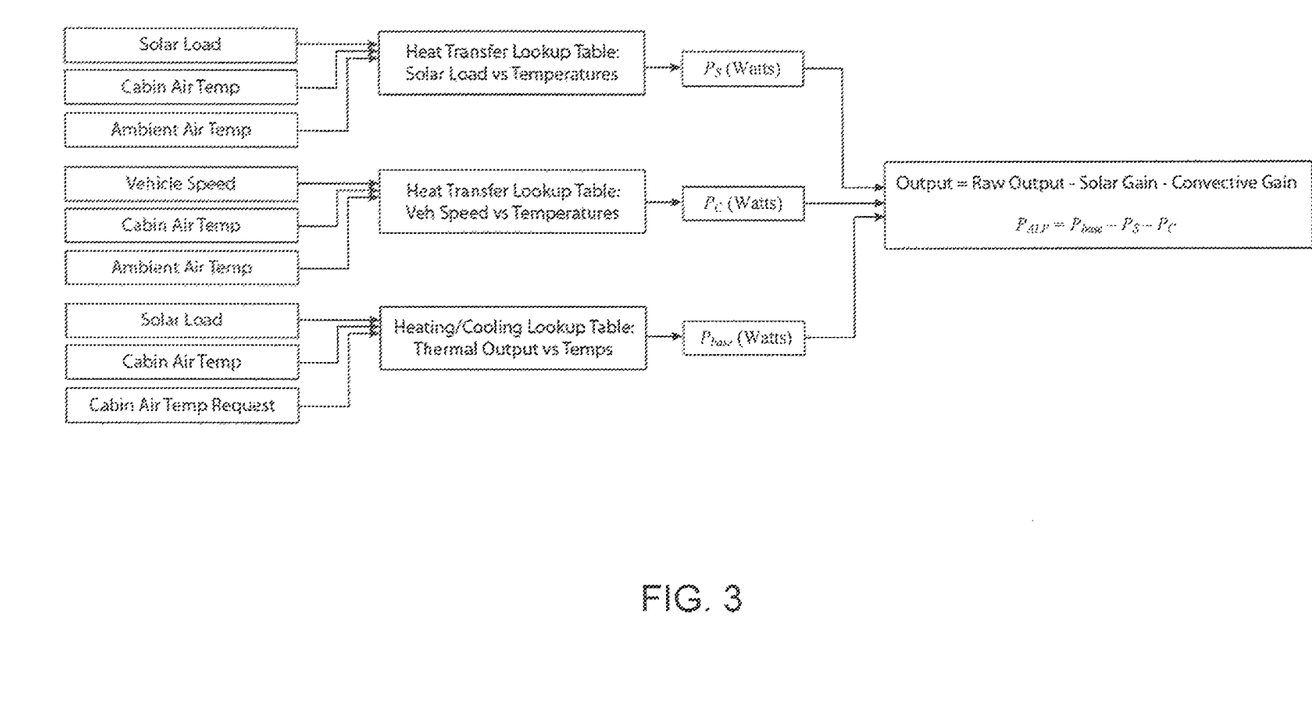
FIG. 3 is a block diagram of a system to determine the power consumption of the electric vehicle of FIG. 1 during the pulldown period and the stabilized period of FIG. 2.

The range calculator 102 determines an auxiliary power load ($P_{APL}$) 202 (as shown in FIG. 2). The auxiliary power load ($P_{APL}$) 202 is characterized by a pulldown period 204 in which of the HVAC control module 112 is adjusting the cabin temperature to the temperature setting and a stabilized period 206 in which the HVAC control module 112 is maintaining the cabin temperature at the temperature setting. FIG. 3 illustrates the environmental factors used to calculate the auxiliary power load ($P_{APL}$) 202. In the illustrated example, the auxiliary power load ($P_{APL}$) 202 includes (i) a base auxiliary power load ($P_{base}$), (ii) a solar gain power load ($P_s$), and (iii) a convective gain power load ($P_c$).

Figure 7:
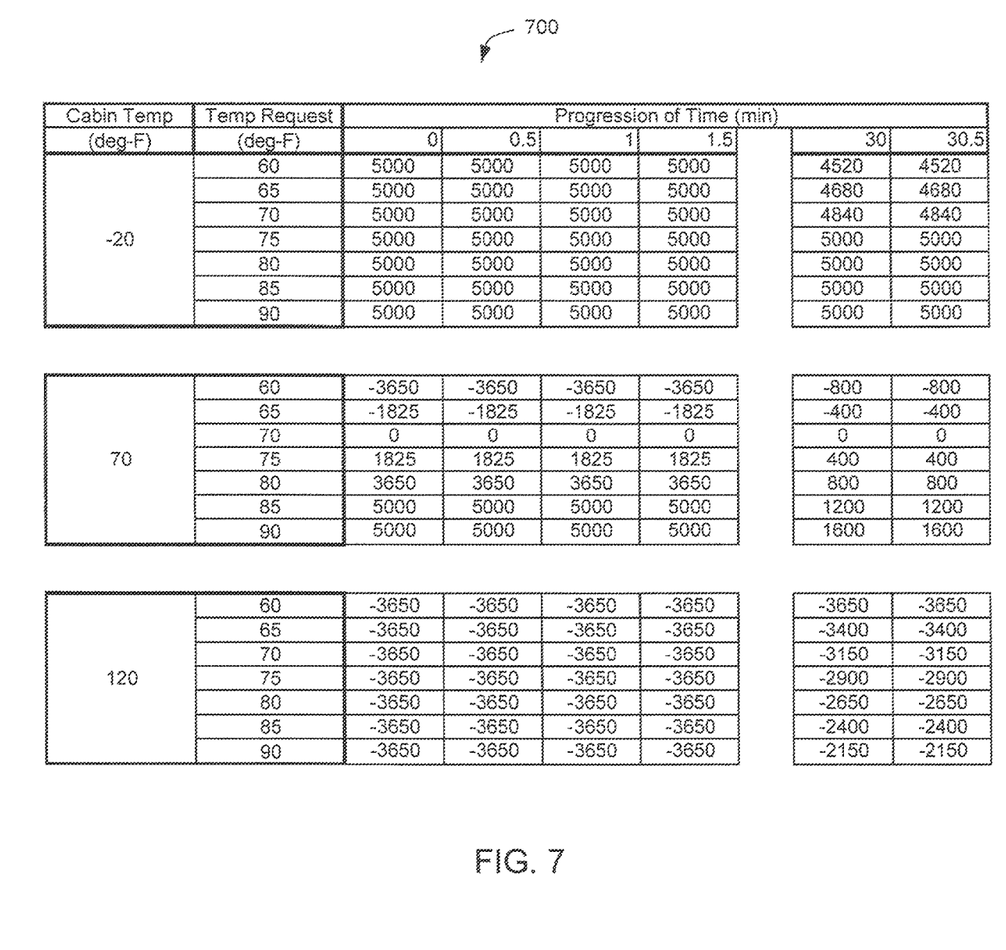
FIG. 7 depicts another example table stored by the electric vehicle of FIG. 1 to determine variable power consumption based on environmental effects.

The range calculator 102 stores a base auxiliary load table 700 to determine the base auxiliary power load ($P_{base}(t)$) as a function of time. An example of the base auxiliary load table 700 is illustrated in FIG. 7. As the HVAC system heats or cools the cabin of the electric vehicle, the base auxiliary power load changes. Less power is used to adjust the temperature of the cabin as the cabin becomes closer to the temperature set point of the HVAC control module 112. The range calculator 102 inputs the cabin air temperature from the cabin temperature sensor 108 and the temperature request setting of the HVAC control module 112 into the base auxiliary load table 700. The base auxiliary load table 700 outputs the base auxiliary power load ($P_{base}(t)$) to adjust the cabin temperature to the temperature setting as a function of time and a pulldown time ($t_p$). The pulldown time ($t_p$) specifies the time to adjust the cabin temperature to the temperature setting. For example, the pulldown time ($t_p$) may be 5 minutes.

Figure 5:
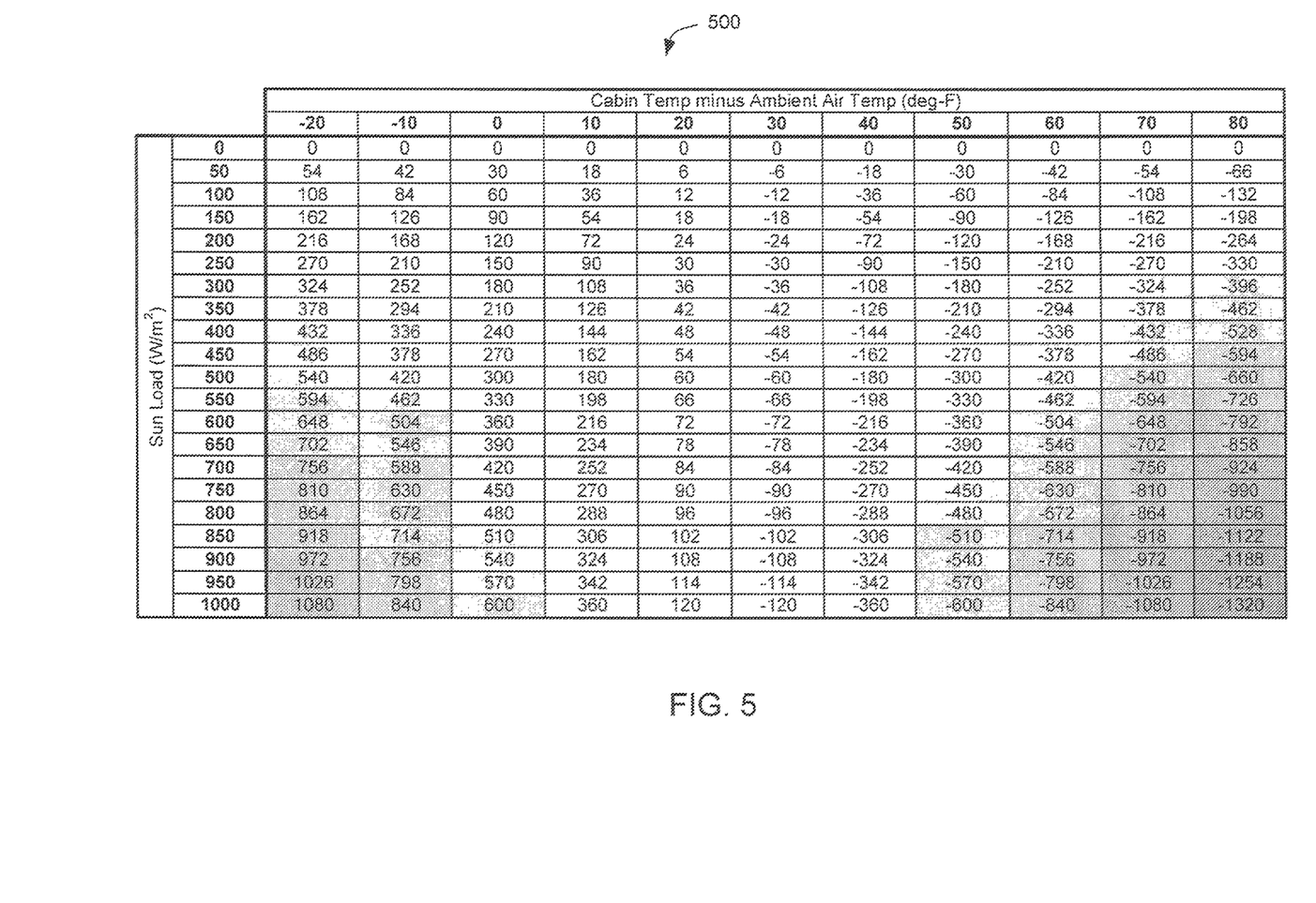
FIG. 5 depicts an example table stored by the electric vehicle of FIG. 1 to determine variable power consumption based on environmental effects.

The range calculator 102 stores a solar heat transfer lookup table 500. An example of the solar heat transfer table 500 is illustrated in FIG. 5. The solar heat transfer lookup table 500 specifies the influence of the solar load (e.g., as specified in the sun load data 114) on the amount of power used by the HVAC control module 112. The sun load contributes to heating the cabin of the electric vehicle 100. The solar load increases the power used by the HVAC control module 112 to cool the cabin of the electric vehicle 100. Additionally, the solar load decreases the power used by the HVAC control module 112 to heat the cabin of the electric vehicle 100. The range calculator 102 inputs the solar load from the sun load data 114 and the difference between the cabin temperature and the ambient temperature into the solar heat transfer lookup table. The solar heat transfer lookup table 500 outputs the solar gain power load ($P_s$).

The range calculator 102 stores a convective heat transfer lookup table 600. An example of the convective heat transfer table 600 is illustrated in FIG. 6. The convective heat transfer lookup table 600 specifies the influence of convective heat losses on the amount of power used by the HVAC control module 112. The convective heat losses increase the power used by the HVAC control module 112 to heat the cabin of the electric vehicle 100. Additionally, the convective heat losses decrease the power used by the HVAC control module 112 to cool the cabin of the electric vehicle 100. The range calculator 102 inputs the speed of the electric vehicle 100 and the difference between the cabin temperature and the ambient temperature into the convective heat transfer lookup table. The convective heat transfer lookup table 600 outputs the convective gain power load ($P_c$).

The range calculator 102 determines the auxiliary power load ($P_{APL}$) 202 in accordance with Equation (1) below.

$$P_{ALP}(t) = P_{base}(t) - P_s - P_c \quad \text{Equation (1)}$$

The range calculator 102 determines the total power load (P) at a point in time (t) in accordance with Equation (2) below.

$$P(t) = P_{BPL} + P_{APL}(t) \quad \text{Equation (2)}$$

In some examples, the total power load (P) also includes a system loss power load to accounts for power losses due to inefficiencies in the power system. Initially, the range calculator 102 determines energy ($E_p$) used by the electric vehicle 100 for the pulldown period by integrating Equation (2) from a time of 0 to the pulldown time ($t_p$). Then, the range calculator 102 determines energy ($E_s$) used by the electric vehicle 100 for the stabilize period by integrating Equation (2) from the pulldown time ($t_p$) to the estimated total travel time ($t_e$). The range calculator 102 estimates the distance travelled during the pulldown period based on the estimated average speed and the pulldown time ($t_p$). For example, if the average speed is 16.8 mph and the pulldown time ($t_p$) is 5 minutes, the distance ($D_p$) travelled during the pulldown period may be 1.4 miles.

The range calculator 102 determines the distance ($D_s$) traveled during the stabilized period based on the estimated distance ($D_e$) and the distance ($D_p$) travelled during the pulldown period. For example, if the estimated distance ($D_e$) is 7 miles and the distance ($D_p$) travelled during the pulldown period is 1.4 miles, the distance ($D_s$) traveled during the stabilized period may be 5.6 miles. The range calculator 102 then determines the energy per mile ($EPD_s$) during the stabilized period by dividing the energy ($E_s$) used by the electric vehicle 100 for the stabilize period by the distance ($D_s$) traveled during the stabilized period. For example, if the energy ($E_s$) used by the electric vehicle 100 for the stabilize period is 3127.6 Watt-hours and the distance ($D_s$) traveled during the stabilized period is 5.6 miles, the energy per mile ($EPD_s$) during the stabilized period may be 558.5 Watt-hours per mile.

The range calculator 102 determines the EV range ($R_{EV}$) of the electric vehicle in accordance with Equation (3) below.

$$R_{EV} = \frac{E_{BP} - E_P}{EPD_s} + D_P \quad \text{Equation (3)}$$

In Equation (3) above, $E_{BP}$ is the total energy stored in the battery pack 104. For example, if the total energy ($E_{BP}$) stored in the battery pack 104 is 15000 Watt-hours, the energy ($E_p$) used by the electric vehicle 100 for the pulldown period is 2100 Watt-hours, the distance ($D_P$) travelled during the pulldown period is 1.4 miles, and the energy per mile ($EPD_s$) during the stabilized period is 558.5 Watt-hours per mile, the EV range ($R_{EV}$) may be 24.5 miles.

In some examples, the range calculator 102 tracks the actual auxiliary power load 202 when the electric vehicle 100 is moving and associates the actual auxiliary power load with the ambient temperature and the sun load from the sun load data 114. In such examples, the range calculator 102 also tracks the actual base power load 200 of the electric vehicle 100 and associates the actual base power load 200 with the ambient temperature, the sun load, and the speed of the electric vehicle 100. In such examples, when a destination and/or route is not know (e.g., not entered into the navigation system, not predictable from past destinations and/or routes, etc.), the range calculator 102 calculates an average value and a standard deviation (sigma) of the past actual auxiliary power load at the current ambient temperature and the current sun load. The range calculator 102 uses the +1-sigma value of the average past actual auxiliary power load as the auxiliary power load 202. For example, if the past actual auxiliary power load has an average of 4892 Watts with a standard deviation (sigma) of 104 Watts, the +1 sigma value used as the auxiliary power load may be 4996 Watts.

In such examples, the range calculator 102 calculates an average value and a standard deviation (sigma) of the past actual base power load 200 at the current ambient temperature and the current sun load. The range calculator 102 uses the +1-sigma value of the average past actual base power load as the base power load 200. For example, if the past actual base power load has an average of 2050 Watts with a standard deviation (sigma) of 92 Watts, the +1 sigma value used as the auxiliary power load 202 may be 2142 Watts. Additionally, the range calculator 102 calculates the average and standard deviation (sigma) of the speed associated with the based power loads used to calculate +1-sigma value of the average past actual base power load. The range calculator 102 uses the −1-sigma value as the average speed of the electric vehicle 100. For example, if the average speed of the electric vehicle 100 is 19.5 mph and the standard deviation (sigma) is 6.4 mph, the range calculator 102 uses 13.1 mph as the average speed of the electric vehicle 100. The range calculator 102 determines the EV range of the electric vehicle to be the energy of the battery pack 104 divided by the total power load (e.g. the +1-sigma base power load 200 and the +1-sigma auxiliary power load 202) and multiplied by the −1-sigma average speed. For example, if the energy of the battery pack is 15000 Watt-hours, the total +1-sigma power load is 7138 Watts, and the −1 sigma average speed is 13.1 mph, the EV range may be 27.5 miles.

Figure 4:
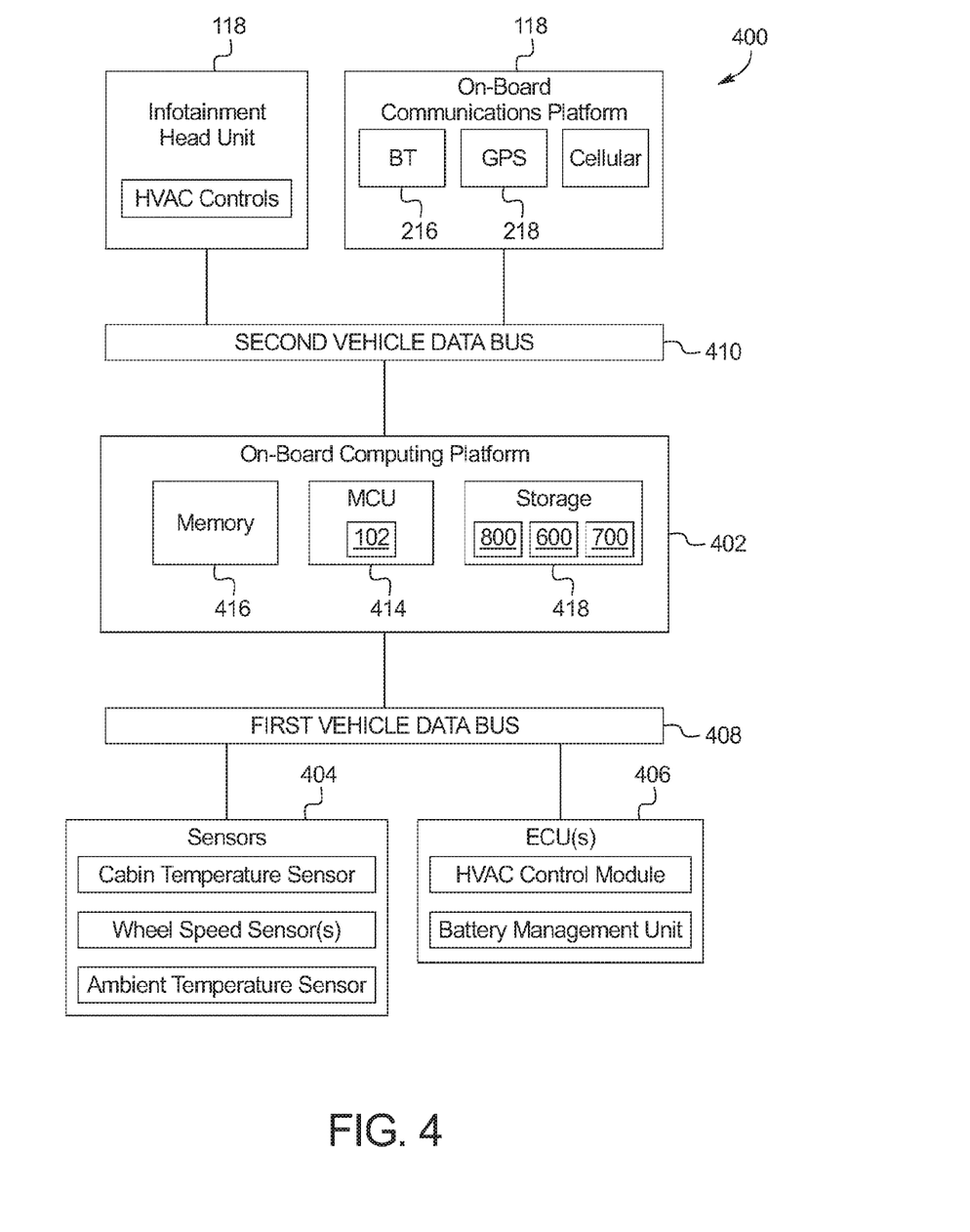
FIG. 4 is a block diagram of electronic components of the electric vehicle of FIG. 1.

FIG. 4 is a block diagram of electronic components 400 of the electric vehicle 100 of FIG. 1. The electronic components 400 include the example on-board communications platform 118, the example infotainment head unit 122, an on-board computing platform 402, example sensors 404, example ECUs 406, a first vehicle data bus 408, and second vehicle data bus 410. In the illustrated example, the infotainment head unit 122 includes HVAC controls 412 communicatively coupled to the HVAC control module 112 to provide an interface for the user to adjust the temperature setting.

The on-board computing platform 402 includes a processor or controller 414, memory 416, and storage 418. In some examples, the on-board computing platform 402 is structured to include the range calculator 102. Alternatively, in some examples, the range calculator 102 may be incorporated into an ECU 406 with its own processor and memory. The processor or controller 414 may be any suitable processing device or set of processing devices such as, but not limited to: a microprocessor, a microcontroller-based platform, a suitable integrated circuit, one or more field programmable gate arrays (FPGSs), and/or one or more application-specific integrated circuits (ASICs). The memory 416 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 416 includes multiple kinds of memory, particularly volatile memory and non-volatile memory. The storage 418 may include any high-capacity storage device, such as a hard drive, and/or a solid state drive. In the illustrated example, the storage 418 includes the base auxiliary load table 500 of FIG. 5, the solar heat transfer lookup table 600 of FIG. 6, and the convective heat transfer lookup table 700 of FIG. 7.

The memory 416 and the storage 418 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 416, the computer readable medium, and/or within the processor 414 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 404 may be arranged in and around the electric vehicle 100 in any suitable fashion. In the illustrated example, the sensors 404 include the cabin temperature sensor(s) 108, the ambient temperature sensor 110, and wheel speed sensor(s) 428. The cabin temperature sensor(s) 108 measure the temperature inside the cabin of the electric vehicle 100. The ambient temperature sensor 110 measures the temperature of the air outside of the electric vehicle 100. In some examples, the wheel speed sensors 420 are used to measure the speed of the electric vehicle 100.

The ECUs 406 monitor and control the systems of the electric vehicle 100. The ECUs 406 communicate and exchange information via the first vehicle data bus 408. Additionally, the ECUs 406 may communicate properties (such as, status of the ECU 406, sensor readings, control state, error and diagnostic codes, etc.) to and/or receive requests from other ECUs 406. Some electric vehicles 100 may have seventy or more ECUs 406 located in various locations around the electric vehicle 100 communicatively coupled together by the first vehicle data bus 408. The ECUs 406 are discrete sets of electronics that include their own circuit(s) (such as integrated circuits, microprocessors, memory, storage, etc.) and firmware, sensors, actuators, and/or mounting hardware. In the illustrated example, the ECUs 406 include the HVAC control module 112 and the battery management unit 106.

The first vehicle data bus 408 communicatively couples the sensors 404, the ECUs 406, the on-board computing platform 402, and other devices connected to the first vehicle data bus 408. In some examples, the first vehicle data bus 408 is implemented in accordance with the controller area network (CAN) bus protocol as defined by International Standards Organization (ISO) 11898-1. Alternatively, in some examples, the first vehicle data bus 408 may be a Media Oriented Systems Transport (MOST) bus, or a CAN flexible data (CAN-FD) bus (ISO 11898-7). The second vehicle data bus 410 communicatively couples the on-board communications platform 118, the infotainment head unit 122, and the on-board computing platform 402. The second vehicle data bus 410 may be a MOST bus, a CAN-FD bus, or an Ethernet bus. In some examples, the on-board computing platform 402 communicatively isolates the first vehicle data bus 408 and the second vehicle data bus 410 (e.g., via firewalls, message brokers, etc.). Alternatively, in some examples, the first vehicle data bus 408 and the second vehicle data bus 410 are the same data bus.

Figure 8:
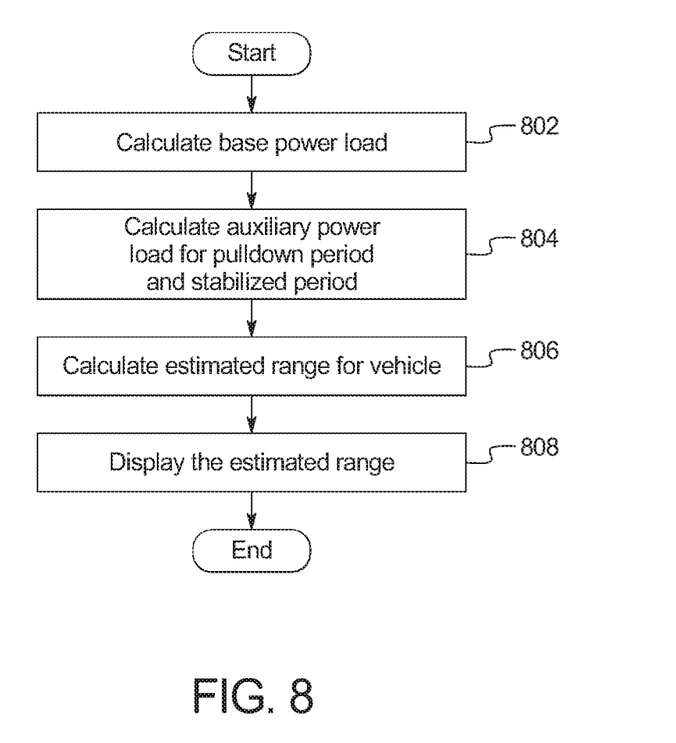
FIG. 8 is a flowchart depicting an example method to determine the power consumption of the electric vehicle of FIG. 1 based on environmental factors that may be implemented by the electronic components of FIG. 4.

FIG. 8 is a flowchart depicting an example method to determine the EV range of the electric vehicle of FIG. 1 based on environmental factors that may be implemented by the electronic components 400 of FIG. 4. Initially, the range calculator 102 calculates the base power load 200 for the electric vehicle 100 (block 802). In some examples, the range calculator 102 calculates the based power load 200 based on the speed and road load force on the route that the range calculator 102 determines that the electric vehicle 100 will likely travel. The range calculator 102 calculates the auxiliary power load 202 of the electric vehicle 100 based on the power used by the HVAC control module 112 to adjust the temperature of the cabin of the electric vehicle 100 to a set temperature (e.g., set via the HVAC controls 412) (block 804). The range calculator 102 determines the auxiliary power load 202 based on ambient temperature, the cabin temperature, the vehicle speed and the set temperature using the base auxiliary load table 500 of FIG. 5, the solar heat transfer lookup table 600 of FIG. 6, and the convective heat transfer lookup table 700 of FIG. 7. In some examples, the range calculator 102 determines the auxiliary power load 202 during the pulldown period 204 and the stabilized period 206. In some such examples, the range calculator 102 also determines the duration (e.g., the pulldown time ($t_P$)) of the pulldown period 204.

Based on the base power load 200 calculated at block 802 and the auxiliary power load 202 calculated at block 804, the range calculator 102 determines the energy per mile (e.g., in Watt-hour per mile) to travel to the destination selected at block 802 (block 806). In some examples, the energy per mile is calculated by integrating the based power load and the auxiliary power load 202 with respect to time, and dividing by the distance to the destination selected at block 802. The range calculator 102 estimates the EV range for the electric vehicle 100 based on the energy in the battery pack 104 and the energy per mile estimated at block 806 (block 808). The range calculator 102 then displays the EV range estimated at block 808 (e.g., via the infotainment head unit 122). The method of FIG. 8 then ends.

The flowchart of FIG. 8 is representative of machine readable instructions that comprise one or more programs that, when executed by a processor (such as the processor 414 of FIG. 4), cause the electric vehicle 100 to implement the range calculator 102 of FIG. 1. Further, although the example program is described with reference to the flowchart illustrated in FIG. 8, many other methods of implementing the example range calculator 102 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a battery pack;
    temperature sensors within a cabin of the vehicle;
    an HVAC control module comprising input devices; and
    an electronic control unit that includes a range calculator configured to:
        determine a base power load;
        select a base auxiliary power load from a table comprising a plurality of base auxiliary power loads based on: (1) a first temperature measured by the temperature sensors, (2) a user-selected temperature value input via the input devices; (3) and an amount of time elapsed since the first temperature was measured by the temperature sensors;
        determine an auxiliary power load based on a solar power load, a convective power load, and the selected base auxiliary power load; and
        calculate a range of the vehicle based on the base power load, the auxiliary power load and a charge of the battery pack.

2. The vehicle of claim 1, wherein the range calculator is configured to predict a route on which the vehicle will travel, the base power load is based on an average speed and an average road load force on the predicted route.

3. The vehicle of claim 2, wherein the range calculator is configured to determine a speed and a road load force for a plurality of segments of the predicted route.

4. The vehicle of claim 1, wherein the auxiliary power load includes a first power load during a first period in which the HVAC control module adjusts a cabin temperature from an initial temperature to a temperature setting and a second power load during a second period in which the HVAC control module maintains the cabin temperature at the temperature setting.

5. The vehicle of claim 1, wherein to determine the base power load, the range calculator is configured to:
    calculate an average base power load based on past power loads at an ambient temperature; and
    determine the base power load to be a statistical variation above the average base power load.

6. The vehicle of claim 5, wherein the statistical variation is one standard deviation above the average base power load.

7. The vehicle of claim 1, wherein the range calculator is further configured to: select the solar power load from a plurality of solar power loads based on: (1) a difference in value between a cabin temperature of the vehicle and an ambient temperature of the vehicle; and (2) and an energy value of solar radiation in a geographical region in which the vehicle is currently located; and
    select the convective power load from a plurality of convective based on the difference in value between the cabin temperature of the vehicle and the ambient temperature of the vehicle; and (2) and a speed of the vehicle.

8. A method to determine an estimated range of an electric vehicle, the method comprising:
    determining a base power load on a battery pack used to drive an electric motor of the electric vehicle;
    selecting a base auxiliary power load from a table comprising a plurality of base auxiliary power loads based on: (1) a first temperature measured by temperature sensors within a cabin of the electric vehicle; (2) a user-selected temperature value input via input devices of an HVAC control module; (3) and an amount of time elapsed since the first temperature was measured by the temperature sensors;
    determining an auxiliary power load on the battery pack used to power the HVAC control module of the electric vehicle based on a solar power load, a convective power bad, and the selected base auxiliary power bad; and calculating, with a processor, the estimated range of the vehicle based on the base power bad, the auxiliary power bad and a charge of the battery pack.

9. The method of claim 8, including predicting a route on which the vehicle will travel, wherein the base power load is based on an average speed and an average road load force on the predicted route.

10. The method of claim 9, including determining a speed and a road load force for a plurality of segments of the predicted route.

11. The method of claim 8, wherein the auxiliary power load includes a first power load during a first period in which the HVAC control module adjusts a cabin temperature from an initial temperature to a temperature setting and a second power load during a second period in which the HVAC control module maintains the cabin temperature at the temperature setting.

12. The method of claim 8, wherein to determine the base power load, the method includes:
calculating an average base power load based on past power loads at an ambient temperature; and
determining the base power load to be one standard deviation above the average base power load.

* * * * *